United States Patent
Tan et al.

(10) Patent No.: US 6,845,634 B2
(45) Date of Patent: Jan. 25, 2005

(54) METHOD FOR FABRICATING THALLIUM-DOPED GRIN LENS

(75) Inventors: Hong Tan, Fremont, CA (US); Youmin Liu, Palo Alto, CA (US); Yushan Tan, Shanghai (CN)

(73) Assignee: Wave Crossing Corporation, Palo Alto, CA (US)

( * ) Notice: Subject to any disclaimer, the term of this patent is extended or adjusted under 35 U.S.C. 154(b) by 428 days.

(21) Appl. No.: 10/175,945

(22) Filed: Jun. 20, 2002

(65) Prior Publication Data

US 2003/0000251 A1 Jan. 2, 2003

Related U.S. Application Data

(60) Provisional application No. 60/300,132, filed on Jun. 21, 2001.

(51) Int. Cl.[7] ............................................. C03B 25/00
(52) U.S. Cl. ................ 65/30.13; 65/30.14; 65/114
(58) Field of Search .................... 65/30.13, 30.14, 65/61, 114

(56) References Cited

U.S. PATENT DOCUMENTS

| | | |
|---|---|---|
| 3,859,103 A | 1/1975 | Yoshiyagawa et al. |
| 3,923,486 A | 12/1975 | Kitano et al. |
| 3,941,474 A | 3/1976 | Kitano et al. |
| 4,462,663 A | 7/1984 | Shimizu et al. |
| 4,495,298 A | 1/1985 | Yamagishi et al. |
| 4,495,299 A | 1/1985 | Noguchi et al. |
| 5,909,529 A | 6/1999 | Bhagavatula |
| 6,128,926 A | 10/2000 | Senapati et al. |
| 6,172,817 B1 | 1/2001 | Senapati et al. |

*Primary Examiner*—Peter Chin
*Assistant Examiner*—C. Lyles-Irving
(74) *Attorney, Agent, or Firm*—Michael Crilly, Esq.

(57) ABSTRACT

A fabrication method for a thallium-doped GRIN lens composed of a simplified glass composition is described. The composition is composed of silicon, oxygen, boron, zinc, potassium, sodium, and thallium. The method is comprised of preparing a cylindrical preform, annealing the cylindrical preform, removing contaminants from preform thereafter extruded to form a glass rod, exposing the glass rod to an alkali salt bath, and chemically milling the glass rod within an acid bath. Method and composition produce colorless lenses with a refractive index from 1.5900 to 1.7810, an insertion loss no greater than 0.05 dB, and a chromatic transmittance greater than 90 percent.

6 Claims, 1 Drawing Sheet

METHOD FOR FABRICATING THALLIUM-DOPED GRIN LENS

CROSS REFERENCE TO RELATED APPLICATIONS

This application claims the benefit of U.S. Provisional Application No. 60/300,132 filed Jun. 21, 2001.

FEDERALLY SPONSORED RESEARCH OR DEVELOPMENT

None.

BACKGROUND OF THE INVENTION

1. Field of the Invention

The present invention generally relates to an improved method for fabricating a thallium-doped gradient index (GRIN) lens. Specifically, the invention is a method whereby a preform composed of a simplified glass composition is chemically and mechanically processed forming a GRIN lens with a parabolical-shaped refractive index.

2. Background

A gradient index (GRIN) lens is an optical component, commonly found in optical telecommunication systems, having an axially, a radially, or a spherically varying refractive index. The profile of the refractive index is tailored during fabrication to facilitate such applications as collimation, coupling, focusing, imaging and alignment.

For example, a parabolic-shaped refractive index provides both imaging and focusing capabilities. The profile of a typical parabolic-shaped refractive index is functionally described by the equation $$N^2(r) = N^2(0)[1 - (gr)^2 + h_4(gr)^4 + h_6(gr)^6 + \ldots]$$

where $N_0$ is the refractive index along the central axis of the lens, r is the radial distance from the central axis, gr is a constant, and h is a high-order coefficient. The focal diameter varies between 0.7 and 2 micrometers for most GRIN lenses. The numerical aperture, NA, of a GRIN lens is calculated by the equation $$(2N_0 * \Delta N)^{1/2}$$

where $\Delta N$ is the difference in refractive index between central axis and periphery along the lens and $N_0$ is the refractive index along the central axis. Commonly, a GRIN lens will have a numerical aperture between 0.46 and 0.6.

The glass composition of a GRIN lens determines its functional and physical characteristics. A high-quality lens has a refractive index of at least 1.600, a chromatic transmittance greater than 90% for light with a wavelength between 380 and 2000 nanometers, and a high degree of composition uniformity so to minimize internal stresses, devitrification, phase separation, and corrosion.

The related arts describe refining agents, typically Cs, Ti, Al, As, Sn, Mg, Ba, Bi, Ge, Pb, Zr, Nd and metal oxides thereof, added to a glass composition to tailor optical properties, minimize devitrification, improve durability, improve weatherability, and adjust melt temperature and viscosity. However, such agents increase fabrication complexity and adversely alter both color and light absorption characteristics of the lens.

A typical cylindrical-shaped GRIN lens has a high refractive index along its central axis with a gradually decreasing index outward to the circumference. The refractive-index gradient is altered by varying the glass composition.

The preferred method within the art for varying glass composition is referred to as diffusion or ion exchange. A thallium-doped glass cylinder having a uniform, high-refractive index is soaked within a molten alkali salt bath, one example being potassium nitrate ($KNO_3$), thereby allowing for an exchange between thallium ions in the glass composition and potassium ions in the bath. The exchange produces a thallium ion gradient within the glass composition and a corresponding refractive index profile. The ion exchange process is influenced by composition uniformity and adversely influenced by stresses, imperfections, and contaminants within the composition. Furthermore, the refining agents described above adversely interact with alkali salts inhibiting the ion exchange process and causing physical degradation to the lens.

Therefore, what is currently required is a method providing for the fabrication of a high-quality GRIN lens composed of a simplified glass composition thereby avoiding the complexities and problems associated with refinement agents.

SUMMARY OF THE INVENTION

An object of the present invention is to provide a method for the fabrication of high-quality GRIN lenses composed of a simplified glass composition.

A further object of the present invention is to provide a fabrication method that eliminates residual stresses within the structure of a simplified glass composition.

A further object of the present invention is to provide a fabrication method that enhances composition uniformity within a lens preform so to improve symmetry of the ion exchange process about the circumference of the lens.

A further object of the present invention is to provide a fabrication method that eliminates contaminants along a lens preform which inhibit the ion exchange process.

The present invention relates to a method for the fabrication of a simplified-composition GRIN lens. GRIN lenses formed by the present method are functionally equivalent to a single convex lens or a combination set of concave-convex lenses. The cylindrical-shaped lenses have a refractive index gradient that continuously decreases, preferably parabolically shaped, in the outward radial direction from the optical or central axis. A typical lens has a diameter in the range of 0.5-mm to 2.0-mm and a length in the range of 1.5-mm to 4.8-mm.

The method of the present invention consists of preparing a cylindrical glass preform composed of the simplified composition, annealing the preform to eliminate residual stresses, removing contaminant layer from said cylindrical preform prior to glass rod extrusion, annealing glass rod during ion exchange process, and immersing glass rod within an acid bath to refine the diameter of the glass rod. The first annealing step is comprised of heating the preform above the annealing temperature for a specified time period followed by a controlled or controlled/uncontrolled cool down. The removing step consists of the mechanical machining and polishing the annealed cylindrical preform. The second annealing step is performed by heating the glass rod to 560° C. for at least 68 hours and no longer than 72 hours. In preferred methods, the acid bath step polishes the exterior surface of the glass rod.

Simplified, glass compositions of the present invention facilitate greater compositional uniformity within the preform, as well as reduce complexities related to fabrication. Glass compositions are composed of elemental boron, oxygen, silicon, potassium, zinc, sodium, and thallium.

Glass compositions contain neither metal nor metal-oxide refining agents. Methods and compositions of the present invention yield colorless lenses with a refractive index from 1.5900 to 1.7810, an insertion loss less than 0.05 dB, and a chromatic transmittance approximately equal to 92 percent.

Several advantages are offered by the present invention. The preform annealing step eliminates internal stresses created during solidification of the preform, reduces porosity within the glass rod, and enhances composition uniformity within the solidified glass. Composition uniformity improves symmetry of the ion exchange process about the circumference of the glass rod within the salt bath. The static salt bath, consisting of a liquid neither refreshed nor stirred during ion exchange, facilitates a more controllable process since process variables are limited to bath temperature and immersion time. Diameter refinement within an acid solution after ion exchange avoids stress related cracking within the GRIN lens.

BRIEF DESCRIPTION OF THE DRAWINGS

The invention will now be described in more detail, by way of example only, with reference to the accompanying figure, in which.

DESCRIPTION OF THE INVENTION

Figure 1:
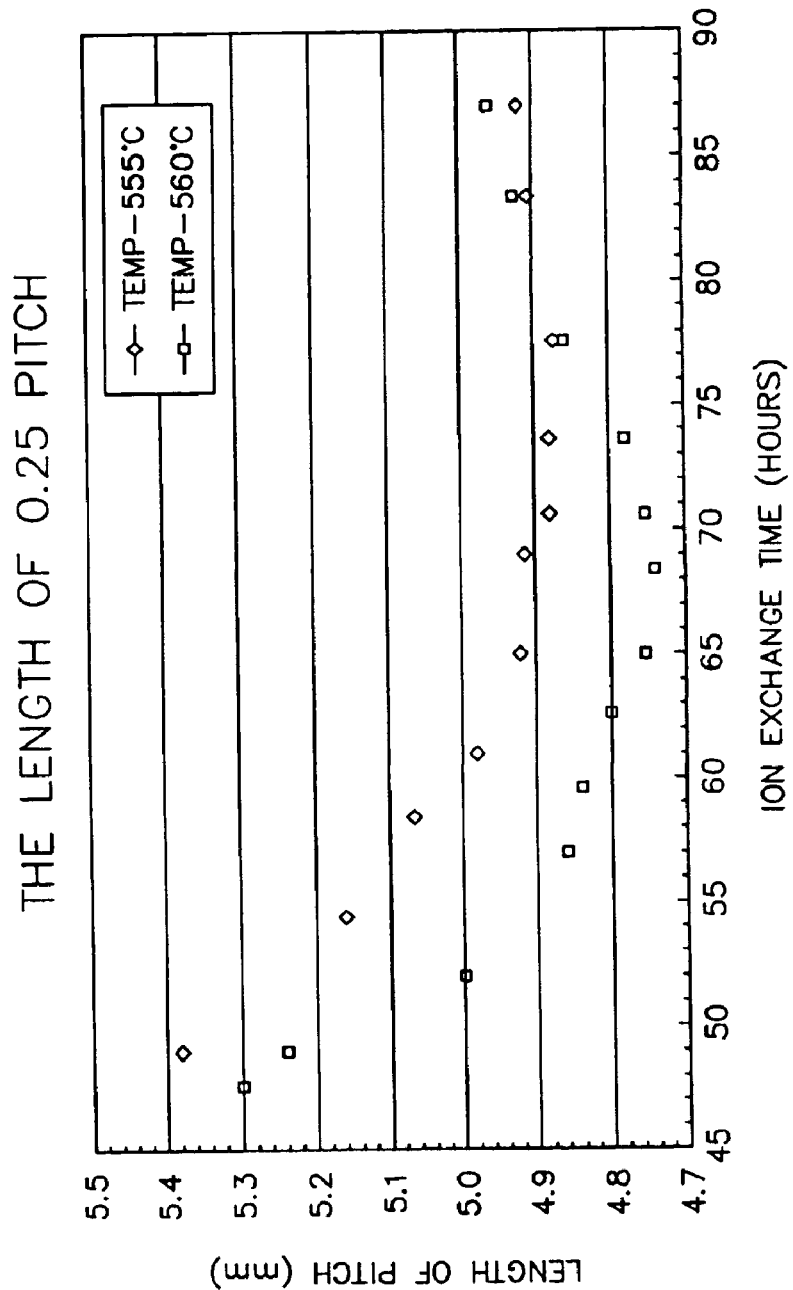
FIG. 1 is a graphical plot of the length of pitch in units of millimeters against ion exchange time in units of hours.

The present invention specifically described is a method of fabrication yielding a high-quality GRIN lens composed of silicon, oxygen, boron, zinc, potassium, sodium, and thallium. The fabrication method includes preparing a solid, cylindrical preform after smelting, annealing the cylindrical preform, removing contaminant layer along exterior of the cylindrical preform, extruding a glass rod from the cylindrical preform, annealing the glass rod during ion exchange process within a salt bath at elevated temperature, and refining diameter and finish along glass rod via an acid bath dip. A variety of high-quality, thallium-doped GRIN lenses are possible with the described method.

The simplified glass composition is composed of elements identified in TABLE 1 at an atomic percentage within the defined range. Thallium content is adjusted to achieve the refractive index within the cylindrical preform. The refractive index is increased via a corresponding change in thallium content, whereas a lower refractive index is achieved by reducing thallium content within the glass composition. A GRIN lens having the maximum thallium content identified in TABLE 1 yields a numerical aperture of 0.6 and a refractive index no greater than 1.70.

TABLE 1

| Element | Atomic % |
| --- | --- |
| Silicon | 15 to 25 |
| Oxygen | 50 to 65 |
| Boron | 0.2 to 4.5 |
| Zinc | 0 to 8 |
| Potassium | 0 to 1.5 |
| Sodium | 2 to 12 |
| Thallium | 2 to 13.5 |

A cylindrical preform composed of a formulation of simplified glass composition was prepared by smelting elements in the desired atomic percentage within a platinum mixing container. While various temperatures above the melt point of the constituents and mixing times were found to be adequate, a highly homogenous composition was achieved by continuously stirring the molten composition heated to a temperature no less than 1370° C. but no more than 1390° C. for an eight hour period. Thereafter, the molten glass composition was poured into a metal die having a cylindrical inner cavity and cooled to solidify the liquid into a solid, cylindrical-shaped preform.

The solidified perform was annealed after it had cooled to room temperature so to eliminate residual stresses and imperfections introduced during preform fabrication, as well as further improve composition homogeneity and uniformity within the preform. A temperature of at least 490° C. adequately annealed the preform. Anneal time was dependent on anneal temperature as well as the diameter of the preform. A cooling rate sufficiently low to avoid the reintroduction of residual stresses was required. Preferred cooling rates no greater than 0.5 degrees-per-minute were adequate for most preforms. The most preferred anneal cycle included heating preform to 525° C. for a period of at least four and no more than five hours followed by a controlled cool down period at a rate of 0.3 degrees-per-minute to 300° C. and a second uncontrolled cool down period to the room temperature.

A thin contaminant layer comprised of oxides and other ion-exchange inhibiting deposits formed along the exterior surface of the preform during preparation and annealing steps. This contaminant layer was removed to maximize the yield of high-quality lenses from a preform by mechanical means including machining and polishing via techniques understood in the art.

Next, the cylindrical glass preform was drawn into a thin glass rod through a drawing tower similar to that for fabricating optical fibers. The preform was heated to a temperature within the range of 800° to 850° C. in accordance with glass composition, preform diameter, and rod diameter. Rod diameter and ellipticity was monitored in real-time with a feedback system to guarantee diametrical accuracy along the glass rod. The preferred monitor system dynamically adjusted draw speed of the rod, feed speed of the preform, and furnace temperature. The diameter of the glass rod was equivalent to that desired in the final lens.

The ion-exchange process was performed by suspending a thallium-doped glass rod within a static salt bath. The static salt bath was composed of potassium nitrate, however other salts known within the art are also applicable. The bath was sufficiently large to insure completion of the ion-exchange process without refreshment or dynamic agitation of the salt. Bath temperature was maintained above the annealing temperature of the glass rod and controlled with equipment understood in the art. For example, a 1.8-mm diameter rod was suspended within a potassium nitrate bath maintained at a temperature of 560° C. for a period no less than 68 hours and no more than 72 hours. A parabolic-shaped refractive index was formed and ion-exchange process ceased when quarter pitch lens shorten to less than 4.80-mm, as graphically depicted in FIG. 1. The duration and temperature of the ion exchange step eliminated residual stresses within the glass rod introduced during drawing step.

After completion of the ion-exchange step, the glass rod was cooled so to avoid the introduction of stresses, cleaned of alkali salt and other residue, and thereafter immersed within an acid bath. The ion-exchange process invariably caused an increase in rod diameter. The acid bath provided a non-mechanical means for milling the rod to its original diameter. Exposure time within the acid bath was dependent on the degree of rod growth during the ion-exchange process, as well as acid strength. A 15 second acid dip within a hydrofluoric acid bath was sufficient for a 1.8-mm diameter glass rod exposed to a potassium bath as described above. Thereafter, the glass rod was cut to length, mechanically or chemically polished, and coated with an anti-reflection material via techniques understood in the art.

The above described method was performed to fabricate two separate batches of 1.8-mm diameter GRIN lenses. TABLE 2 describes the elemental composition for each batch. A 650-nm laser source facilitated measurement of the refractive index along the central axis. Batch 1 and Batch 2 lenses had a refractive index of 1.6055 and 1.6003, respectively. All lenses had an insertion loss of approximately 0.05 dB with a corresponding numerical aperture of 0.46.

TABLE 2

| Element | Atomic % (Batch 1) | Atomic % (Batch 2) |
|---|---|---|
| Silicon | 19.23 | 19.87 |
| Oxygen | 59.50 | 59.59 |
| Boron | 2.17 | 2.14 |
| Zinc | 5.26 | 5.53 |
| Potassium | 0.80 | 0.68 |
| Sodium | 8.01 | 8.13 |
| Thallium | 5.03 | 4.06 |

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A method for making a GRIN lens comprising the steps of:

(a) preparing a cylindrical preform consisting essentially of silicon in the range of 15 to 25 atomic %, oxygen in the range of 50 to 65 atomic %, boron in the range of 0.2 to 4.5 atomic %, zinc in the range of 0 to 8 atomic %, potassium in the range of 0 to 1.5 atomic %, sodium in the range of 2 to 12 atomic %, and thallium in the range of 2 to 13.5 atomic %;

(b) annealing said cylindrical preform to eliminate residual stresses;

(c) removing a contaminant layer from said cylindrical preform, said cylindrical preform thereafter extruded into a glass rod;

(d) annealing said glass rod during an ion exchange process within a static bath composed of alkali salt; and (e) milling said glass rod within an acid bath to refine diameter of said glass rod.

2. The method of claim 1, wherein first said annealing step is comprised of heating said cylindrical preform in the range of 490 to 550 degrees Celsius for at least 3 hours and cooling said cylindrical preform at a rate of 0.5 degrees-per-minute.

3. The method of claim 1, wherein first said annealing step is comprised of heating said cylindrical preform to 525 degrees Celsius for at least 4 hours and no more than 5 hours and cooling said cylindrical preform at a controlled rate of 0.3 degrees-per-minute to 300 degrees Celsius followed by an uncontrolled rate to room temperature.

4. The method of claim 1, wherein said removing step includes machining and polishing said cylindrical preform.

5. The method of claim 1, wherein second said annealing step is performed at 560 degrees Celsius for at least 68 hours and no longer than 72 hours, said glass rod cooled so to avoid the introduction of residual stresses.

6. The method of claim 1, wherein said milling step polishes said glass rod.

* * * * *